United States Patent [19]

Uchiike

[11] Patent Number: 5,338,902
[45] Date of Patent: Aug. 16, 1994

[54] ELECTRONIC BALANCE

[75] Inventor: Mitsumasa Uchiike, Kyoto, Japan

[73] Assignee: Shimadzu Corporation, Kyoto, Japan

[21] Appl. No.: 36,827

[22] Filed: Mar. 25, 1993

[30] Foreign Application Priority Data

Apr. 27, 1992 [JP] Japan .................. 4-136112

[51] Int. Cl.5 .................. G01G 21/24; G01G 3/08
[52] U.S. Cl. .................. 177/255; 177/229
[58] Field of Search .................. 177/229, 255

[56] References Cited

U.S. PATENT DOCUMENTS

| | | | |
|---|---|---|---|
| 4,300,648 | 11/1981 | Gallo et al. | 177/229 |
| 4,799,561 | 1/1989 | Komoto | 177/229 |
| 4,846,294 | 7/1989 | Sato | 177/210 C |
| 5,191,949 | 3/1993 | Mills et al. | 177/229 |

Primary Examiner—George H. Miller, Jr.
Attorney, Agent, or Firm—Heller, Ehrman, White & McAuliffe

[57] ABSTRACT

An electronic balance incorporating a Roberval mechanism has a weighing pan attached to a vertically elongated arm connected to one end of a beam such that the arm remains vertically oriented as the beam swings around its supporting point in the middle. A shutter is attached to the opposite end of the beam and a position sensor for detecting the position of the shutter is firmly attached to the arm such that the shutter and the position sensor moves in mutually opposite directions as an object to be weighed is placed on the weighing pan and the beam swings around its supporting point.

4 Claims, 2 Drawing Sheets

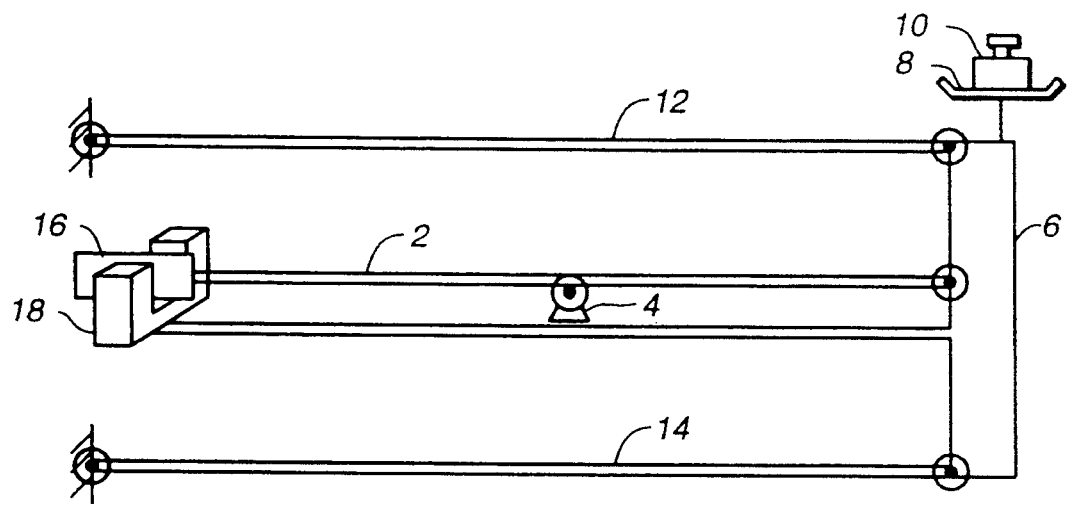
FIG._1
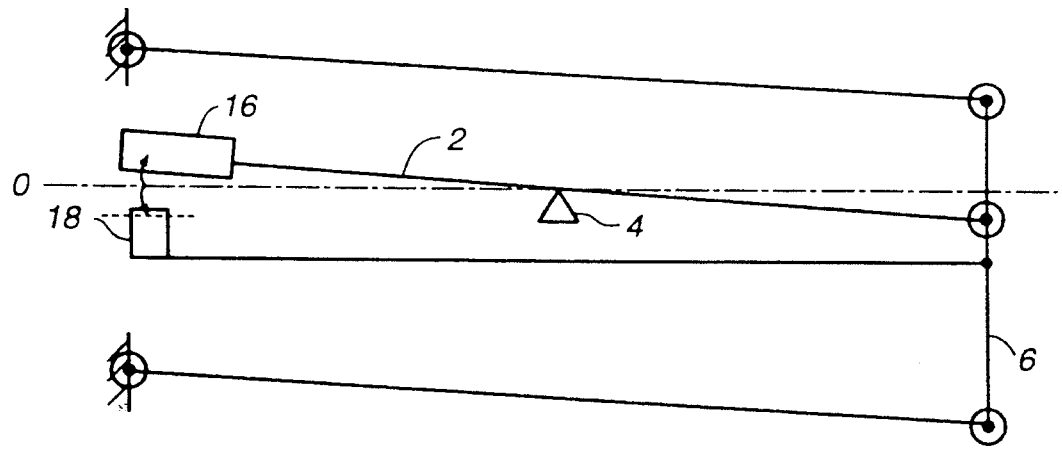
FIG._2
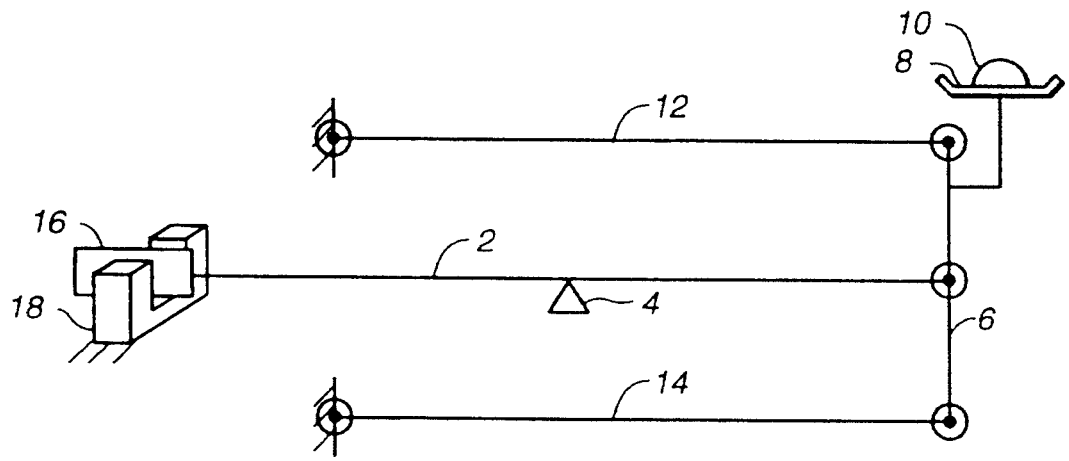
FIG._4
(PRIOR ART)

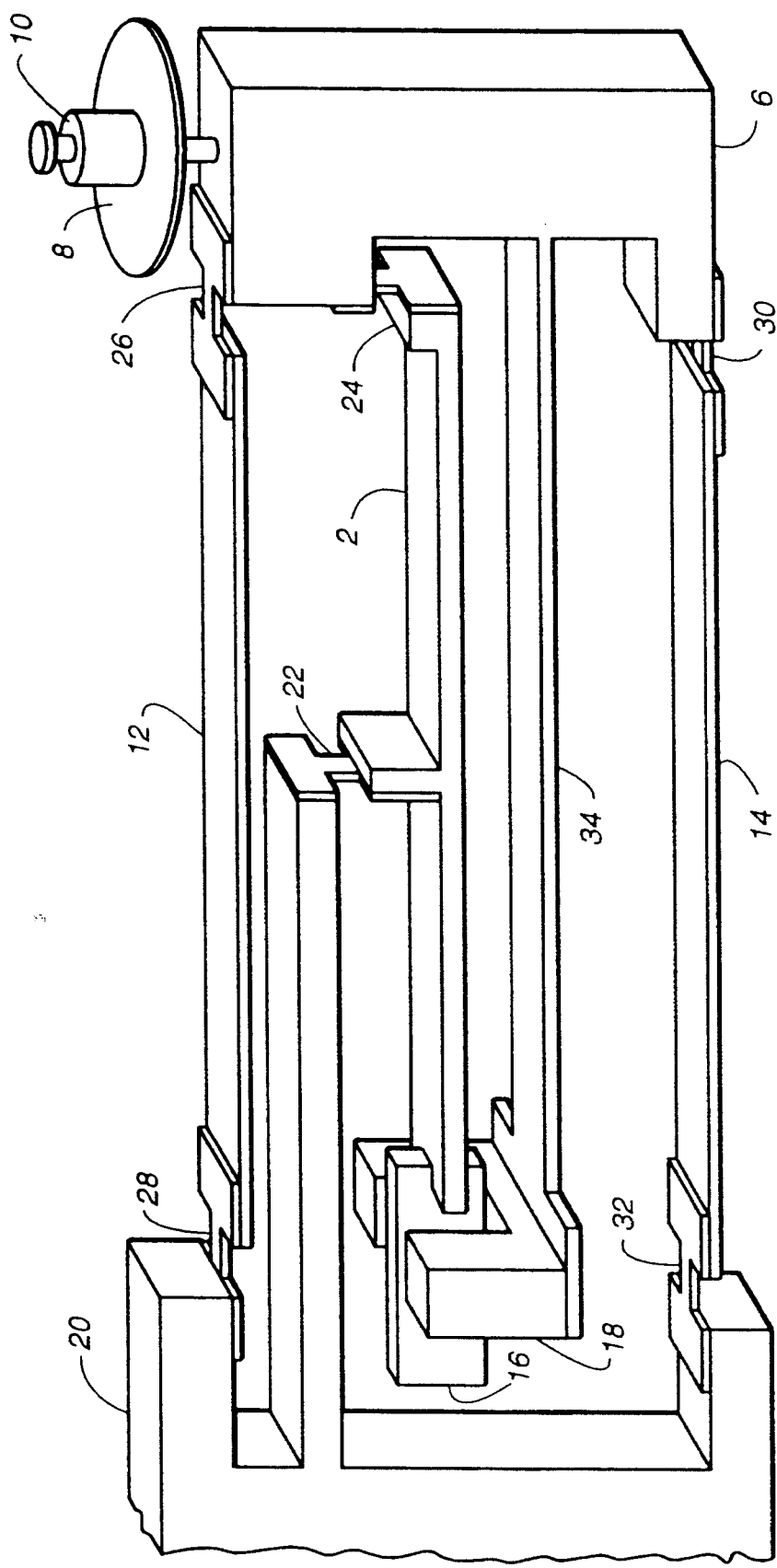
FIG._3

ELECTRONIC BALANCE

BACKGROUND OF THE INVENTION

This invention relates to an electronic balance incorporating an improved Roberval mechanism, having at one end thereof a weighing pan attached through a movable vertical arm maintained in a vertical position and at the other end thereof a shutter coupled with a position sensor.

The principles of an electronic balance incorporating a Roberval mechanism will be explained first with reference to FIG. 4, wherein numeral 2 indicates a lever beam of the balance supported at a supporting point 4 in the middle. A weighing pan 8 for carrying an object to be weighed is attached to one end of the beam 2 through a vertical arm 6 which is adapted to move while maintaining a vertical orientation. A shutter 16, adapted to couple with a position sensor 18, is provided at the other end of the beam 2. The aforementioned Roberval mechanism is for the purpose of moving the vertically extended arm 6 while maintaining its vertical orientation and is comprised of a pair of mutually parallel horizontal arms 12 and 14, one end of which is respectively connected rotatably to the top end and the bottom end of the vertical arm 6, while the other ends of these horizontal arms 12 and 14 are rotatably supported by a fixed part such as the main body of the balance. The position sensor 18 is fastened also to a fixed part such as the main body of the balance. The Roberval mechanism has the known advantage of causing the same force to be applied to the balance, independently of the position of a sample 10 placed on the weighing pan 8.

With the electronic balance shown in FIG. 4, the shutter 16 moves vertically according to the movement of the vertical arm 6, and it is this motion of the shutter 16 that is detected by the position sensor 18. To improve the sensitivity of such a balance, or to increase the output of such a position sensor when a sample is placed on the weighing pan 8, it is necessary to make the beam 2 longer so as to improve its angular resolution. If the beam 2 is made longer, however, it affects the overall size of the electronic balance. It is an object of the present invention to improve the sensitivity of an electronic balance without increasing the length of its beam.

SUMMARY OF THE INVENTION

The principle, on which the present invention is based, will be described with reference to FIG. 1, in which components which are like those shown in FIG. 4 and explained above will be indicated by the same numerals. FIG. 1 also shows a lever beam 2 supported at a supporting point 4 in the middle, having a weighing pan 8 attached to one end of the beam 2 through a vertical arm 6 which is adapted to move while maintaining a vertical orientation, and a shutter 16 coupled with a position sensor 18 at the other end of the beam 2. A main difference is that the position sensor 18 is fastened to the vertical arm 6 such that the position sensor 18 and the shutter 16 will move in mutually opposite directions.

The operation of the balance according to the present invention is further explained with reference to FIG. 2. Let O indicate the balanced position of the shutter 6 when there is no load on the weighing pan 8. If a sample 10 is placed on the weighing pan 8, the vertical arm 6 moves downward, causing the beam 2 to rotate around its supporting point 4. This causes the shutter 16 to move upwards, but the position sensor 18 moves downward in the meantime because the position sensor 18 and the vertical arm 6 are fastened to each other so as to move vertically together. In other words, the shutter 16 and the position sensor 18 move vertically in opposite directions with respect to each other. Thus, the output from the position sensor 18 is greater than in the case of FIG. 4, and the sensitivity of the balance is also improved.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a schematic drawing showing the principle of the present invention;

FIG. 2 is a schematic drawing showing the operation of a balance according to the invention;

FIG. 3 is a diagonal view of a principal part of an electronic balance embodying the present invention; and FIG. 4 is a schematic drawing showing the principle of a prior art electronic balance incorporating a Roberval mechanism.

In all these figures, components which are substantially alike or comparable are indicated by the same numerals.

DETAILED DESCRIPTION OF THE INVENTION

In FIG. 3, numeral 2 indicates a beam hung at a midpoint thereof from a fixed structure 20 such as the main body of the balance itself through an elastic connecting piece 22. A vertically elongated arm 6 is attached to one end of the beam 2 through another elastic connecting piece 24. The upper end of this vertically elongated arm 6 is attached to one end of a horizontally elongated arm 12 through still another elastic connecting piece 26. The other end of the horizontally elongated arm 12 is attached to the fixed structure 20 through still another elastic Connecting piece 28. The lower end of the vertically elongated arm 6 is attached to one end of another horizontally elongated arm 14 through still another elastic connecting piece 30. The other end of this horizontally elongated arm 14 is attached to the fixed structure 20 through still another elastic connecting piece 32.

As shown in FIG. 3, the two horizontally elongated arms 12 and 14 are of the same length, and the separation between the elastic connecting pieces 26 and 30 and that between the elastic connecting pieces 28 and 32 are the same. In other words, the four elastic connecting pieces 26, 28, 30 and 32 are always at the four corners of a parallelogram, independently of the position of the vertically elongated arm 6 with respect to the fixed structure 20. Thus, the vertically elongated arm 6 remains vertically oriented as the vertically elongated arm 6 is moved with respect to the fixed structure 20. When the balance is in an equilibrium condition, the two horizontally elongated arms 12 and 14 are both exactly horizontal. The elastic connecting members 22, 24, 26, 28, 30 and 32 are all formed with a narrowed portion so as to be bendable thereacross.

A shutter 16 is attached to the other end of the beam 2 distal from the vertically elongated arm 6. A position sensor 18 which couples with the shutter 16 is firmly attached to the vertically elongated arm 6 through a horizontally extending supporting member 34 unistructurally formed therewith so as to be able to move vertically upwards and downwards therewith. The position sensor 18 is of a known type comprising a light-source such as a light-emitting diode and a light-receiving element such as a photo-diode or a photo-transistor so as to detect the position of the shutter 16 with respect thereto.

A weighing pan 8 is attached to the top edge of the vertically elongated arm 6 for having a sample 10 placed thereon to be weighed. As mentioned above, the elastic connecting pieces 22, 24, 26, 28, 30 and 32 are resiliently bendable so as to be deformed, as shown in and explained with reference to FIGS. 1 and 2.

Although the present invention was described by way of only one embodiment, the invention is not intended to be limited thereby. The invention may be principally characterized as having the position sensor 18 firmly attached to the vertically elongated arm 6. The other components can be appropriately modified or varied. For example, the weighing pan 8 may be attached to any other part of the vertically elongated arm 6. In summary, the present invention provides a way to increase the sensitivity of an balance without increasing the length of its beam by making the position sensor move upwards and downwards together with the vertically elongated arm of its Roberval mechanism. Any modifications and variations on the disclosed embodiment that may be apparent to a person skilled in the art are intended to be within the scope of the invention.

What is claimed is:

1. In an electronic balance having a beam rotatably supported at a mid-point thereof and incorporating a Roberval mechanism comprising a vertically elongated member rotatably attached to one end of said beam so as to remain vertically oriented as said beam swings around said mid-point, and a shutter for a position sensor capable of detecting the position of said shutter with respect thereto, said shutter being attached to the other end of said beam and a weighing pan being attached to said vertically elongated member, the improvement wherein said position sensor and said vertically elongated member are firmly attached to each other and move together such that said position sensor and said shutter move in mutually opposite directions as said beam swings around said mid-point.

2. The electronic balance of claim 1 wherein said Roberval mechanism further comprises a pair of horizontally extended members with one end rotatably attached to an upper or lower end point of said vertically elongated member and the other end rotatably attached to an immobile structure of said electronic balance.

3. The electronic balance of claim 1 wherein said beam and said vertically elongated member are connected by a resiliently bendable piece.

4. The electronic balance of claim 1 wherein said vertically elongated member has a supporting member which extends horizontally therefrom and is formed unistructurally therewith, said position sensor being firmly affixed to said supporting member.

* * * * *